(12) United States Patent
Reisinger et al.

(10) Patent No.: US 6,616,150 B2
(45) Date of Patent: Sep. 9, 2003

(54) RIDE LEVELER SYSTEM IN VEHICLES

(75) Inventors: Stefan Reisinger, Tuerkenfeld (DE); Juergen Brack, Waltenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/732,942

(22) Filed: Dec. 11, 2000

(65) Prior Publication Data

US 2001/0004147 A1 Jun. 21, 2001

(30) Foreign Application Priority Data

Dec. 10, 1999 (DE) .......................... 199 59 658

(51) Int. Cl.$^7$ .............................. B60G 17/015
(52) U.S. Cl. ........................ 280/5.514; 701/37
(58) Field of Search ................ 280/5.514, 6.157, 280/6.158, 6.159; 701/37

(56) References Cited

U.S. PATENT DOCUMENTS

| 4,349,077 A | 9/1982 | Sekiguchi et al. ............. 180/41 |
| 5,130,927 A | * 7/1992 | Kunishima et al. ...... 280/5.514 |
| 5,450,322 A | 9/1995 | Tanaka et al. ......... 364/424.05 |

FOREIGN PATENT DOCUMENTS

| DE | 3644942 A1 | 5/1988 |
| DE | 40 03 781 | 10/1990 |
| DE | 4333823 A1 | 4/1995 |
| DE | 19640149 A1 | 4/1998 |
| EP | 0 217 356 | 4/1987 |
| EP | 0 315 458 | 5/1989 |
| JP | 60-33115 | 2/1985 |

* cited by examiner

*Primary Examiner*—Peter C. English

(57) ABSTRACT

A ride leveler system in vehicles with an adjustable wheel suspension device between a vehicle wheel and the vehicle body, with a height sensor for measuring the actual height between the vehicle wheel and the vehicle body, and with an electronic control device which specifies a target height and adjusts the wheel suspension device until the attainment of the target height. If there is a deviation between target and actual height, the electronic control device adjusts the wheel suspension device for a minimum period of time independent of the course of the actual height. Following expiration of the minimum control time, the adjustment is switched off at a point in time at which the measured actual height has attained the value of the target height for the first time.

4 Claims, 2 Drawing Sheets

RIDE LEVELER SYSTEM IN VEHICLES

BACKGROUND OF THE INVENTION

The invention concerns an automobile ride leveler system.

A ride leveler system of this type is known by way of example from German Patent DE 196 40 149 A1. This known ride leveler system has wheel suspension devices in the form of pneumatic spring devices. The height sensors measure actual distances between the vehicle axles and the automobile body at the same time as the actual height differences between an automobile wheel and the automobile body. If a preset deviation between target and actual height is present, in this known ride leveler system the switch-off time of the adjustment of a wheel suspension device is set depending on the trailing behavior of the vehicle body. This is intended to prevent overshoot behavior. This system does not account for the danger of premature switch-off of the adjustment.

In other ride leveler systems, which are active even while the vehicle is in operation, when a deviation between target and actual level occurs, ride leveling is executed until the level sensor first senses the value of the target height or target level. In order for attainment of the target level with ride level regulation by means of height sensors to be recognized as delay-free as possible, a relatively fast filtration of the sensor signals is necessary. As a result, however, the sensing of road stimulations is essentially unfiltered. Ride level regulation can, as a result, be recognized as terminated before the actual attainment of the target level if the target level is detected by the height sensor for a brief period as a result of spring deflection and rebound.

The object of the invention is to improve a ride leveler system of the type mentioned above in order to prevent the danger of premature switch-off of level regulation.

SUMMARY OF THE INVENTION

The ride leveler system in vehicles according to the invention has an adjustable wheel suspension device between a vehicle wheel and the vehicle body, a height sensor for determining the actual height between a vehicle wheel and the vehicle body, and an electronic control device. A wheel suspension device and a height sensor may, for example, be provided for each vehicle wheel or only for the vehicle wheels of one axle. The control device specifies a target height and causes the adjustment of the wheel suspension device until the attainment of the target height, as long as there is a deviation between target and actual height. Fundamentally there should be no deviation between target and actual height, although ordinarily there will be a tolerance range in order to avoid too frequently occurring regulation. When there is a deviation between target and actual height, which preferably is greater than the specified allowable deviation, the electronic control device accordingly begins to adjust the wheel suspension device for a specified minimum control period depending on the path of the actual height. After expiration of the minimum control time, the control device does not switch the adjustment off until the measured actual height first attains the target height or has already exceeded it.

Preferably the minimum control period is specified through empirically determined experimental values, stored in the control device, of the adjustment speed for the particular wheel suspension device and control device used depending on the deviation to be compensated.

During the minimum control period, level control can thus not be recognized as terminated on the basis of a signal from the height sensors. Only after the expiration of this specified minimum control period are the preferably quickly filtered height sensor signals used for recognition of attained target level. Thus, a spring deflection and/or rebound, during which the target level is briefly attained, does not result in a premature termination of level regulation during the minimum control period. As a result of the minimum control period, there is a guaranteed minimum adjustment travel which contributes to an enhancement of the quality of regulation, in particular, in the case of strong road stimulation, as for example, in the case of a bad stretch of road or wavy road surface. As a result, there is a reduction of the frequency of regulation. Furthermore, in the case of a lowering or raising of the vehicle level for safety reasons, no condition is signaled to the driver which has not yet been attained.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
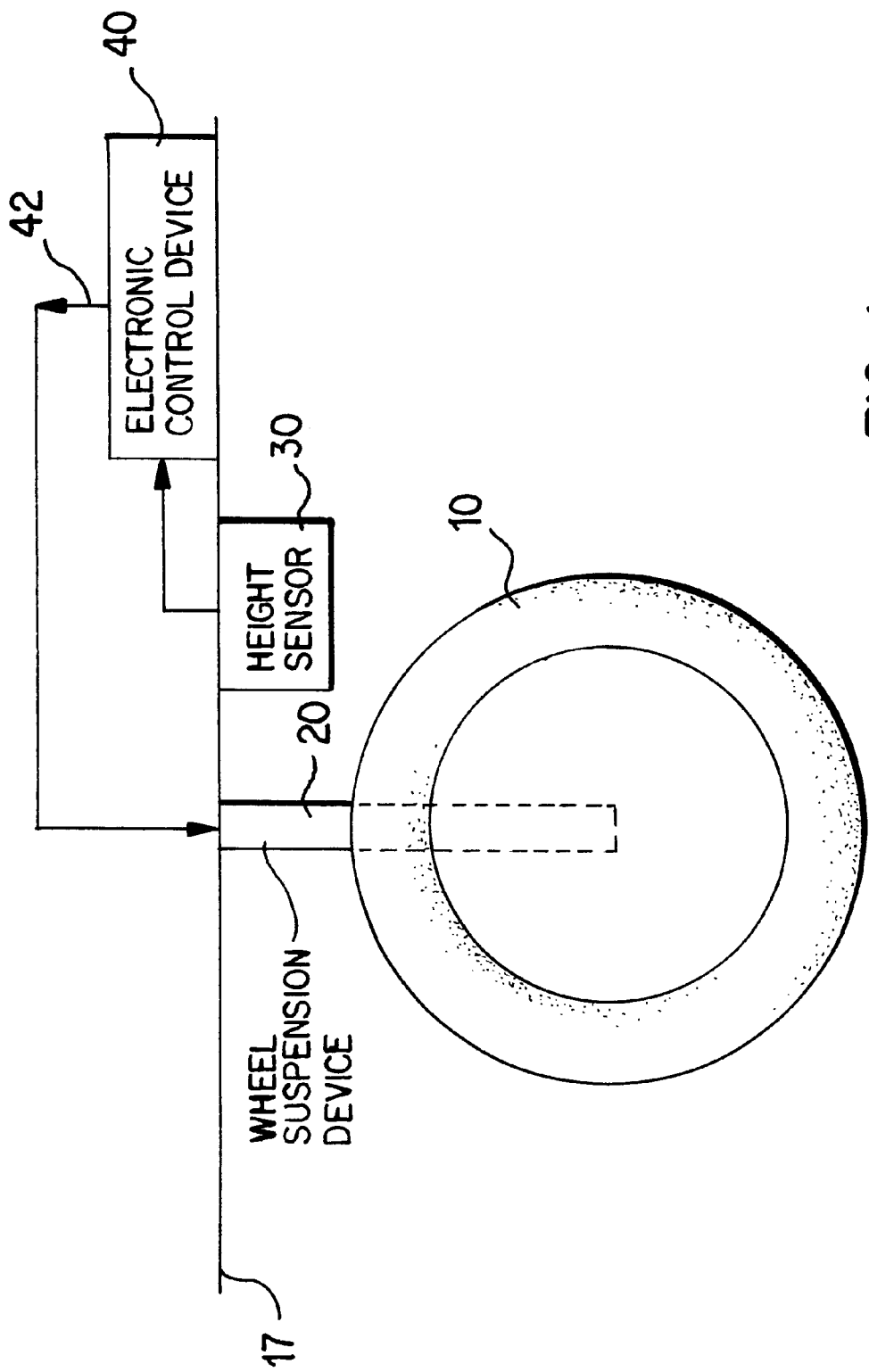
FIG. 1 is a block diagram illustrating the components of the leveler system of the present invention.

The leveler system is shown in FIG. 1 as including a wheel and a suspension system 20 positioned between the wheel 10 and the vehicle body 17. A sensor 30 determines the height between the wheel and the body. The output of the sensor is fed to an electronic controller device 40 which functions to control the adjustable wheel suspension 20 to adjust the height in accordance with output 42.

Figure 2:
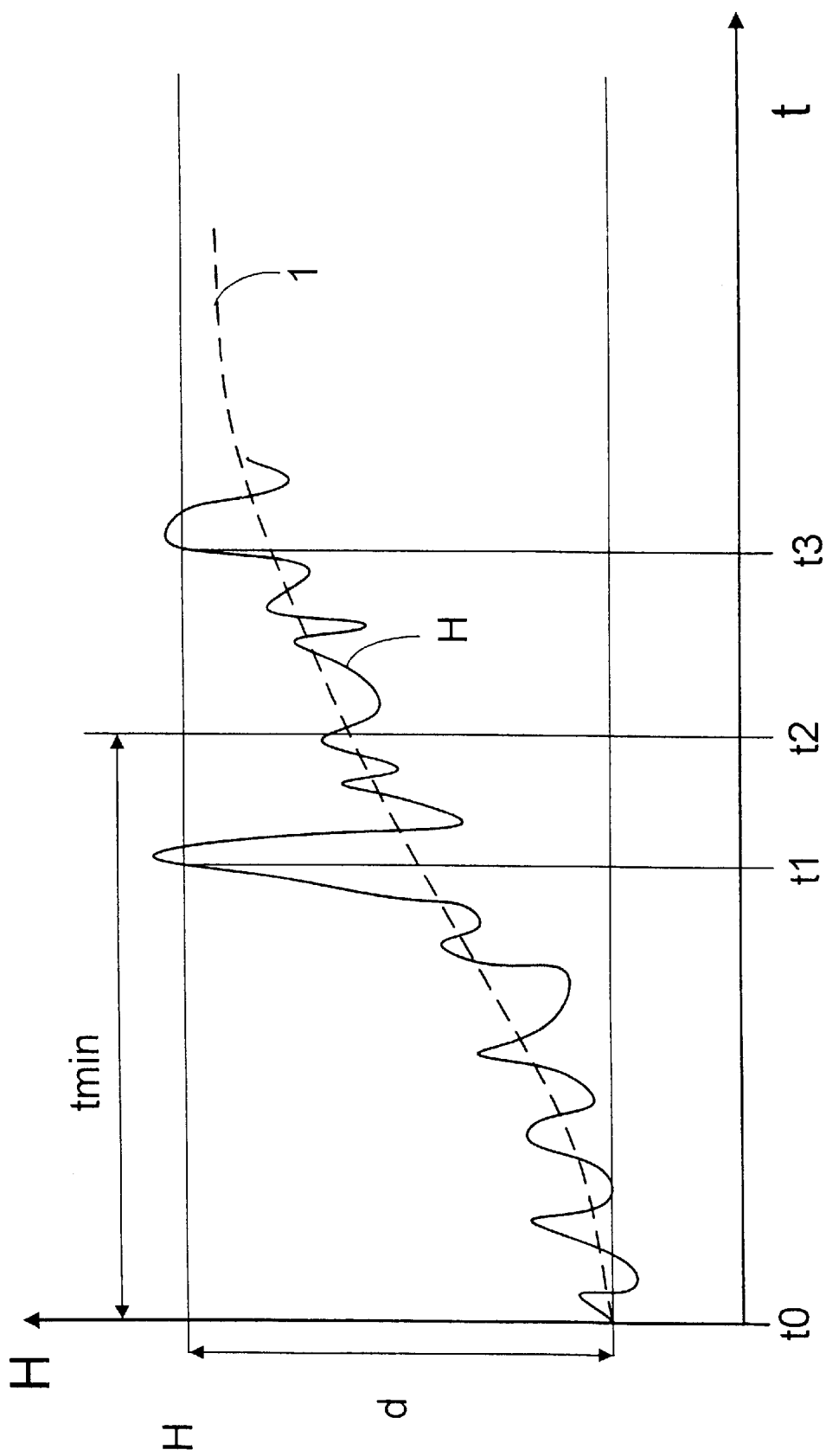
FIG. 2 is a simplification of a time section of a regulation sequence for a vehicle with the ride leveler system according to the invention.

Time t is plotted on the abscissa and height H is plotted on the ordinate in FIG. 2. In the diagram, the curve of the actual height $H_{ist}$ is depicted over time t. Dashed curve 1 shows the averaged actual height path for comparison.

At time t0, there is a deviation d between a target height $H_{soll}$ and the actual height $H_{ist}$. Level regulation begins in order to execute an adjustment of the wheel suspension device until time t2 for the specified minimum control time tmin in the form of a pure time control. The path of the actual height $H_{ist}$ is ignored until time t2. At time t1, within the minimum control time tmin, for example, a road surface stimulation occurs which results in the height sensor displaying the attainment of the target height $H_{soll}$. In a ride leveler system according to the prior art, the ride level regulation would accordingly be terminated prematurely at time point t1. According to the exemplary embodiment of the invention, however, this "overshoot" is ignored. After the expiration of the minimum control time tmin, the curve of the actual height $H_{ist}$ is again evaluated by the control device. At time t3, actual height $H_{ist}$ achieves the value of target height $H_{soll}$ for the first time following expiration of the minimum control time. In the ride leveler system according to the invention, level regulation is thus terminated at time point t3 or the adjustment of the wheel suspension device is switched off. Even if the "overshoot" should occur at time point t3 as a result of unevenness of the road, a substantially sufficient level regulation is ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A ride leveler system for a vehicle comprising:
   an adjustable wheel suspension device between a wheel of said vehicle and a body of said vehicle;
   a height sensor for measuring the distance between said vehicle wheel and said vehicle body;
   an electronic control device for adjusting the wheel suspension device until a height measurement output from said height sensor is substantially equal to a predetermined stored height wherein the adjustment of the suspension device occurs for a predetermined minimum time when there is a deviation between said stored height and the height measured by said sensor wherein said predetermined minimum time is independent of previously measured values of the height from said height sensor and whereby, after the end of said predetermined minimum time, said control device outputs a signal to stop adjustment of said wheel suspension device at a point in time at which the height sensor output measures a value which substantially equals said stored height.

2. The ride leveler system according to 1, wherein said predetermined minimum time is stored in said control device and is a function of the adjustment speed of said wheel suspension device.

3. A method for adjusting the distance between a vehicle wheel and a vehicle body, comprising the steps of:
   providing an adjustable wheel suspension device between a vehicle wheel and a vehicle body;
   measuring an actual height between said vehicle wheel and said vehicle body;
   defining a target height between said vehicle wheel and said vehicle body;
   comparing said target height with said measured actual height and, if there is a deviation between said target height and said actual height, adjusting said wheel suspension device for a predetermined minimum time wherein said predetermined minimum time is independent of previous measurements of said actual height;
   switching off said adjustment of said suspension device at a point in time wherein the measured actual height is substantially equal to said target height, after the expiration of said predetermined minimum time.

4. The method according to claim 3, wherein the step of adjusting said wheel suspension device for a predetermined minimum time includes the step of determining said predetermined minimum time as a function of an adjustment speed of said wheel suspension device.

* * * * *